July 25, 1961 W. G. FROEDE 2,993,482
SUPERCHARGING SYSTEM FOR ROTATING COMBUSTION ENGINE
Filed June 8, 1960 8 Sheets-Sheet 3

INVENTOR.
WALTER G. FROEDE
BY
Morgan, Finnegan, Durham & Pine
ATTORNEYS

July 25, 1961 W. G. FROEDE 2,993,482
SUPERCHARGING SYSTEM FOR ROTATING COMBUSTION ENGINE
Filed June 8, 1960 8 Sheets-Sheet 4

INVENTOR.
WALTER G. FROEDE
BY
Morgan, Finnegan, Durham & Pine
ATTORNEYS

July 25, 1961  W. G. FROEDE  2,993,482
SUPERCHARGING SYSTEM FOR ROTATING COMBUSTION ENGINE
Filed June 8, 1960  8 Sheets-Sheet 6

INVENTOR.
WALTER G. FROEDE
BY
Morgan, Finnegan, Durham & Pine
ATTORNEYS

July 25, 1961 W. G. FROEDE 2,993,482
SUPERCHARGING SYSTEM FOR ROTATING COMBUSTION ENGINE
Filed June 8, 1960 8 Sheets-Sheet 7

INVENTOR.
WALTER G. FROEDE
BY
Morgan, Finnegan, Durham & Pine
ATTORNEYS

July 25, 1961 W. G. FROEDE 2,993,482
SUPERCHARGING SYSTEM FOR ROTATING COMBUSTION ENGINE
Filed June 8, 1960 8 Sheets-Sheet 8

INVENTOR.
WALTER G. FROEDE
BY
Morgan, Finnegan, Durham & Pine
ATTORNEYS

# United States Patent Office 2,993,482
Patented July 25, 1961

2,993,482
SUPERCHARGING SYSTEM FOR ROTATING COMBUSTION ENGINE
Walter G. Froede, Neckarsulm, Germany, assignor to NSU Motorenwerk Aktiengesellschaft, Neckarsulm, and Wankel G.m.b.H., Lindau Bodensee, both in Germany
Filed June 8, 1960, Ser. No. 34,670
Claims priority, application Germany June 9, 1959
18 Claims. (Cl. 123—8)

The present invention relates to means for supercharging rotating combustion engines, and more particularly to a compressor means for supercharging and improving the efficiency of rotating combustion engines.

Supercharging systems for internal combustion engines of the conventional type which use reciprocating pistons have been well known for some time. Similarly to supercharging systems used with conventional piston-type internal combustion engines, the present invention is concerned with the problem of providing a supercharging system that will improve the effectiveness, usefulness, and efficiency of a rotating combustion engine.

The present invention is particularly useful in rotating combustion engines of the type which comprises an outer body having an axis, axially-spaced end walls, and a peripheral wall interconnecting the end walls; the inner surfaces of the peripheral wall and end walls form a cavity, and an inner body or rotor is mounted within the cavity between its end walls. The inner surface of the peripheral wall is preferably parallel to the axis of the cavity and, as viewed in a plane transverse to this axis, the inner surface preferably has a multi-lobed profile which is substantially an epitrochoid.

The axis of the rotor is eccentric from and parallel to the axis of the cavity of the outer body, and the rotor has axially-spaced end faces disposed adjacent to the end walls of the outer body and a plurality of circumferentially-spaced apex portions. The rotor is rotatable relative to the outer body such that the apex portions substantially continuously engage the inner surface of the outer body to form a plurality of working chambers which vary in volume during engine operation, as a result of relative rotation between the rotor and the outer body.

Such engines also include an intake passage for administering a fuel-air mixture to the chambers, an exhaust port for the chambers, and suitable ignition means so that during engine operation the working chambers of the engine undergo a cycle of operation which includes the four phases of intake, compression, expansion, and exhaust. This cycle of operation is achieved as a result of the relative rotation of the inner body and outer body, and for this purpose both the inner body and outer body may rotate at different speeds, but preferably the inner body or rotor rotates while the outer body is stationary.

For efficient operation of the engine, its working chambers should be sealed, and therefore an effective seal is provided between each rotor apex portion and the inner surface of the peripheral wall of the outer body, as well as between the end faces of the inner body or rotor and the inner surface of the end walls of the outer body.

The combustion medium which is employed by this engine may be a typical fuel-air mixture, or a stoichiometric mixture. One of the important features of the supercharging system of the present invention is that its use permits less-volatile fuels to be employed in operation of the engine.

It is known that the output and efficiency of conventional reciprocating engines may be increased by supercharging. The operation of conventional reciprocating engines by sucking or drawing pure air into a working chamber and then subsequently blowing an over-rich fuel-air mixture into the chamber to permit the efficient use of less-volatile fuels is also known. A further method in use with conventional reciprocating engines to increase their efficiency, is to suck or draw pure air into a working chamber and then subsequent to the intake stroke to blow into the same working chamber precompressed air to which fuel is added and admixed just prior to its introduction into the working chamber to obtain a through dispersion of the fuel-air mixture in the working chamber.

One embodiment of the rotating combustion engine which has been successfully used in practice is an engine in which the multi-lobed inner surface of the outer body has substantially the geometric form of an epitrochoid. The outer surface of the inner body or rotor has a plurality of apex portions which continuously engage the multi-lobed inner surface of the outer body, and the number of these apex portions is preferably one more than the number of lobes.

Between the apex portions of its outer surface the rotor has a contour which permits its rotation relative to the outer body without mechanical interference with the multi-lobed inner surface of the outer body. The maximum profile which the outer surface of the rotor can have between its apex portions and still be free to rotate without interference is known as the "inner envelope" of the multi-lobed inner surface. The profile of the rotor which is illustrated in the accompanying drawings approximates this "inner envelope."

For purposes of illustration the following description will be related to the present preferred embodiment of the engine in which the inner surface of the outer body defines a two-lobed epitrochoid, and the rotor or inner body has three apex portions and is generally triangular in cross-section but has curved or arcuate sides.

It is not intended that the invention be limited, however, to the form in which the inner surface of the outer body approximates a two-lobed epitrochoid and the inner body or rotor has only three apex portions. In other embodiments of the invention the inner surface of the outer body may have a different plural number of lobes with the rotor having one more apex portion than the inner surface of the outer body has lobes.

In accordance with the present invention, means are provided for supercharging a rotating combustion engine or a series of such engines. In the present preferred embodiment, the means for supercharging is a compressor which, in the principal features of its construction, is very similar to the rotating combustion engines which it supercharges.

In the illustrative embodiment of the invention, which is to be described in detail below, two rotating combustion engines are provided having their rotors rotatably mounted upon eccentrics which are disposed on a common shaft. A compressor is positioned between the two engines, and the compressor rotor is also mounted for rotation on an eccentric disposed on this same common shaft.

The compressor comprises a rotor mounted for rotation within an outer body, and the compressor rotor and outer body have substantially the same geometrical configuration as the corresponding parts of the rotating combustion engines. The inner surface of the outer body of the compressor is, thus, substantially an epitrochoid, and its rotor has three apex portions which continuously engage the inner surface of the outer body in sliding and sealing engagement.

The compressor does, however, differ from the engines in that its cycle has only the two phases of intake and compression, as opposed to the rotating combustion engines which have a four-phase cycle of intake, compression, expansion, and exhaust. Accordingly, the compressor is arranged so that it is capable of performing two cycles for the same amount of rotation of its rotor relative to its outer body as is necessary to perform one cycle in the rotating combustion engines.

For each revolution of the shaft (which, in the present preferred embodiment, is a common shaft for both the compressor and its associated engines), one of the working chambers in each of the engines goes through a complete intake phase, and the compressor performs two complete intake and delivery phases in the same interval. The compressor is, thus, able to directly feed a precompressed charge alternately to the two engines.

In accordance with the invention, means are provided to deliver a precompressed charge, or output of the compressor, to each of the engines as input to the engines for each revolution of the shaft. As embodied, the means for delivering the precompressed charge from the compressor to the engines, are two transfer passages provided within common intermediate walls between the compressor and the two engines, and the ports of these transfer passages are controlled on one side by the compressor rotor, and on the other side by the engine rotors. These ports are suitably arranged so that they are opened not earlier than approximately at the end of the suction stroke of the respective engines to prevent any part of the precompressed charge from streaming out through the intake ports of the engines.

To obtain a thorough dispersion of the charge, it is desirable to arrange the ports of the transfer channel so that they are opened when a pressure ratio greater than the critical pressure ratio exists between the compression chamber of the compressor and the working chamber of its associated engine into which the charge is to be delivered. This arrangement is particularly important when an over-rich mixture is to be blown into the chamber of the engine.

To insure that the transfer passages will be as short as possible, the rotors and outer bodies of the engines are angularly displaced relative to the rotor and outer body of the compressor.

It is a primary object of the present invention to provide a novel rotating combustion engine and supercharger combination in which a single supercharger directly supercharges two engines.

Another object of the present invention is to provide means for increasing the efficiency and output of a rotating combustion engine by delivering a precompressed charge to the engine after the engine has virtually completed its normal intake phase.

Another object of the present invention is to provide compressor means for supercharging two rotating combustion engines in a combination in which the engines drive and the compressor is driven by a common shaft.

Another object of the present invention is to provide a compressor supercharging means which will deliver a precompressed charge to each of two rotating combustion engines for each revolution of a common shaft which drives the compressor and is driven by the engines.

Another object of the instant invention is to provide a compressor supercharging means for two rotating combustion engines which performs two delivery phases for each intake phase of each engine to directly feed a precompressed charge alternately to the two engines.

Another object of the present invention is to provide a supercharging means for a rotating combustion engine which can blow an over-rich precompressed fuel-air mixture into the working chamber of the engine after the chamber has been filled with air by the normal engine intake phase.

Another object of the present invention is to provide a supercharging means for a rotating combustion engine which will permit the efficient and effective use of less-volatile fuels with the engine.

Another object of the present invention is to provide a supercharging means for a rotating combustion engine which after a normal intake of pure air, can provide a thoroughly dispersed precompressed fuel-air mixture by admixing fuel and precompressed air in the transfer channel leading to the working chamber of the engine.

It is another object of the instant invention to provide a supercharging compressor between two rotating combustion engines which alternately feeds the two engines with a precompressed charge of air or a fuel-air mixture which, for example, may be an over-rich, or a stoichiometric, mixture.

It is another object of the instant invention to provide a rotating combustion engine unit which has a simple and efficient supercharging means which in turn gives the engine unit a very large power output with small dimensions and weight.

Another object of the present invention is to provide supercharging means for a rotating combustion engine which automatically injects the precompressed charge into the working chamber of the engine not earlier than approximately at the end of the normal intake phase of the engine.

A further object of the present invention is to provide a supercharged rotating combustion engine unit having a shaft including three eccentric portions, two of which are in phase and diametrically opposed to the third, and each of which carries a rotor to provide a unit comprising two engines and a compressor, in which each engine is fed a precompressed charge by the compressor, once during each revolution of the shaft.

A still further object of the present invention is to provide an improved rotating combustion engine unit having supercharging means which is of simple design and construction, economical to manufacture, and highly efficient in operation.

To achieve the foregoing objects, and in accordance with its purpose, the present invention provides means which, as embodied, comprises a pair of rotating combustion engines disposed on opposite sides of a compressor. The compressor is driven by, and the engines drive a common shaft. During each revolution of the shaft, each engine has one suction phase and receives one precompressed charge from the compressor.

The engines and compressor each include an outer body and a rotor which are rotatable relative to one another to provide variable volume working chambers between the working faces of the rotors and the inner surfaces of the outer bodies. The two engines are constructed so that their rotors are in phase with each other, but their cycles of operation of 180° out of phase.

The common shaft has three eccentric portions, two of which have the rotors of the engine rotatably mounted upon them for rotation, and one of which has the rotor of the compressor mounted upon it for rotation. The two engine eccentrics are in phase, but the compressor eccentric is diametrically opposed to the engine eccentrics.

Broadly described, the present invention provides an internal combustion engine unit comprising two rotating combustion engines and a supercharger which delivers a precompressed charge directly and alternately to the two engines once for each intake phase of the engines.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

The invention consists in the novel parts, constructions, arrangements, combinations, and improvements shown and described.

The accompanying drawings, which are incorporated in and constitute a part of this specification, illustrate one embodiment of the invention and, together with the description, serve to explain the principles of the invention.

Of the drawings:

FIG. 2 is taken on line 2—2 of FIG. 1, looking in the direction of the arrows;

FIG. 3 is taken on the line 3—3 of FIG. 1; looking in the direction of the arrows;

Figure 1:
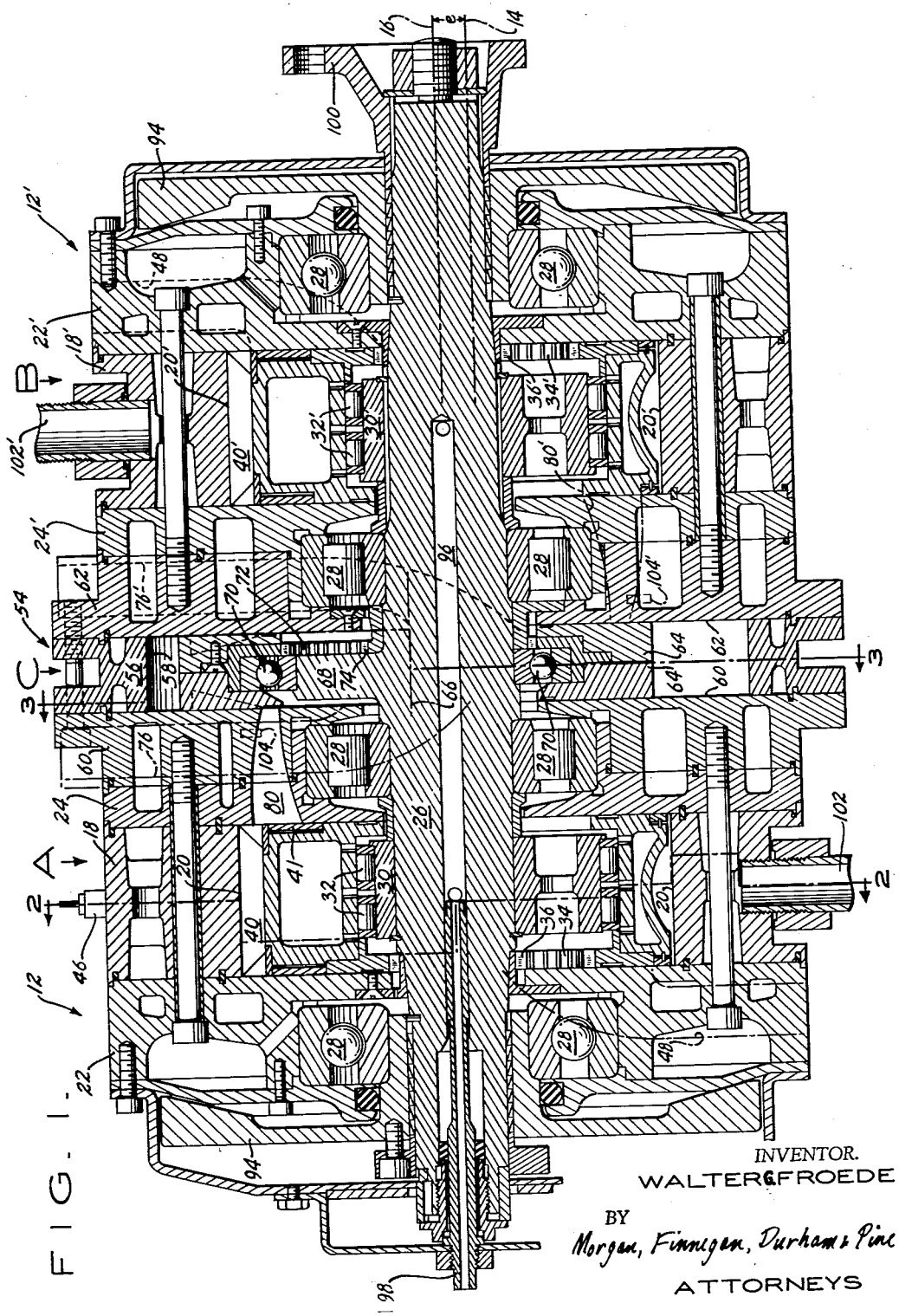
FIG. 1 is a central longitudinal section of an embodiment of the invention showing two rotating combustion engine units A and B positioned on opposite sides of a supercharging means C.
Figure 4A:
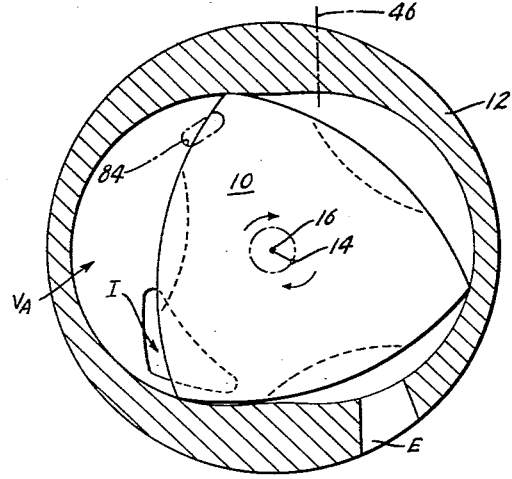
Figure 4C:
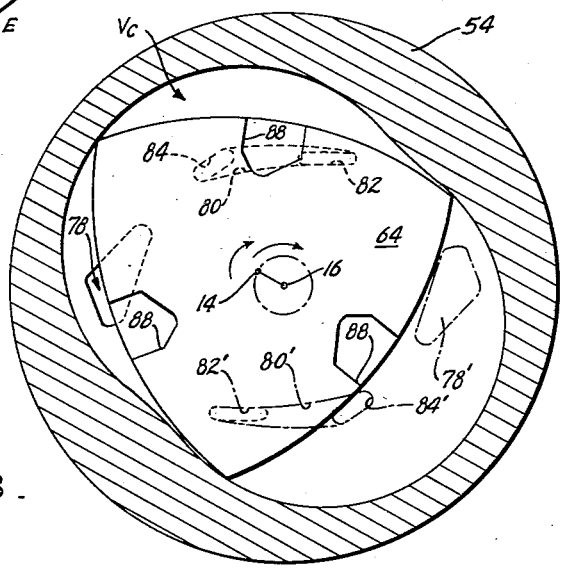
Figure 4B:
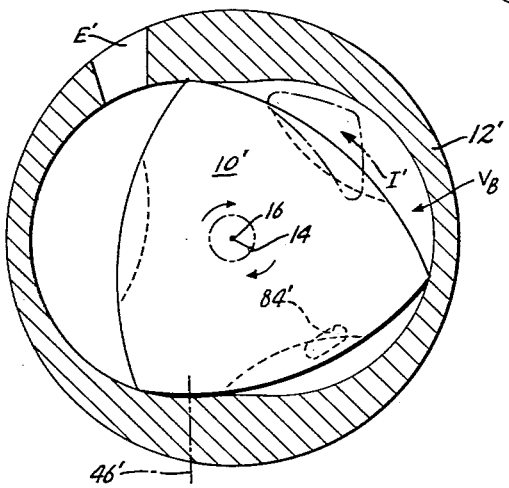
Figure 5A:
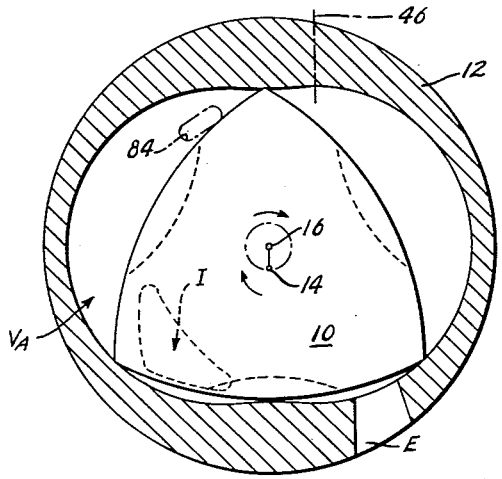
Figure 5C:
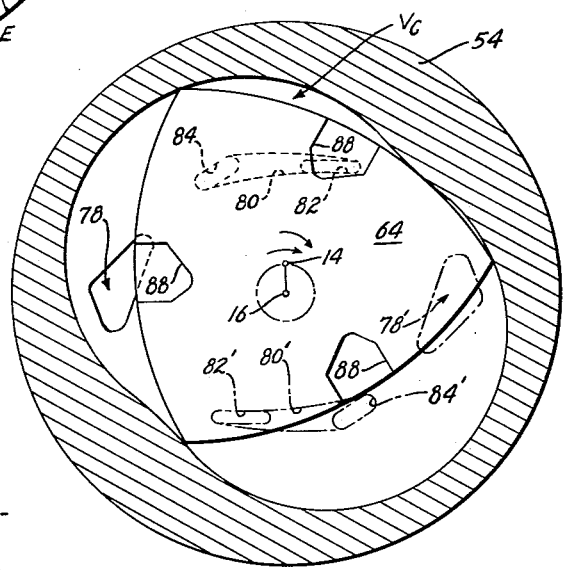
Figure 5B:
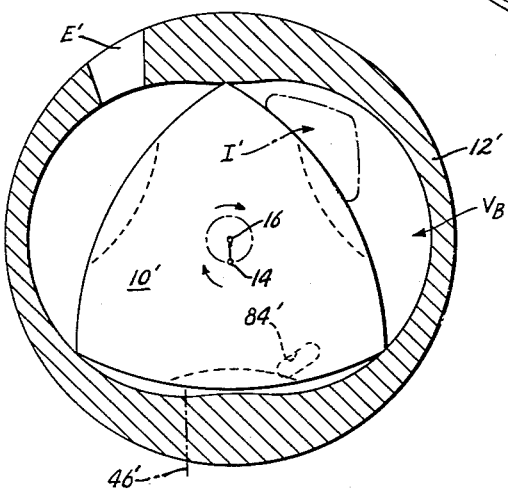
Figure 6A:
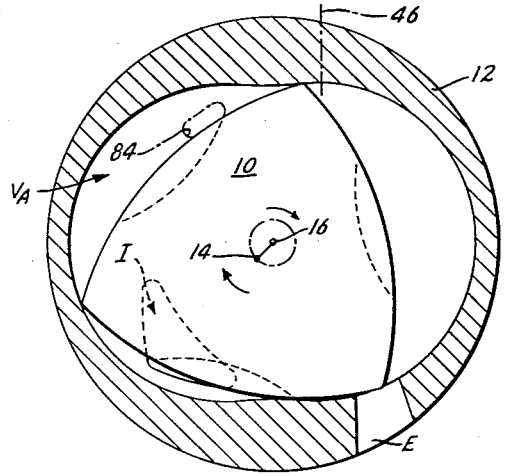
Figure 6C:
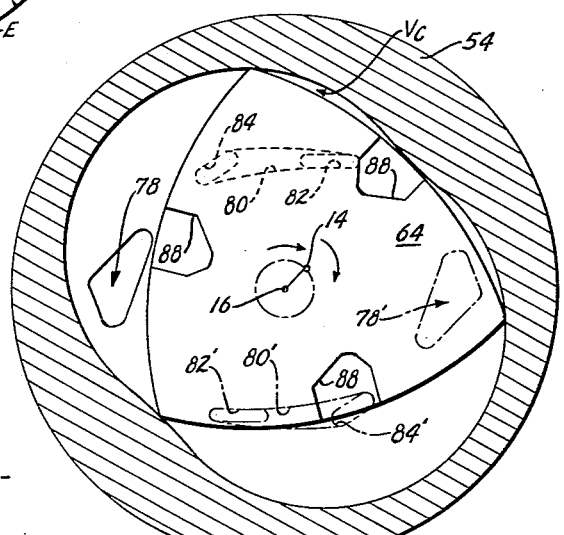
Figure 6B:
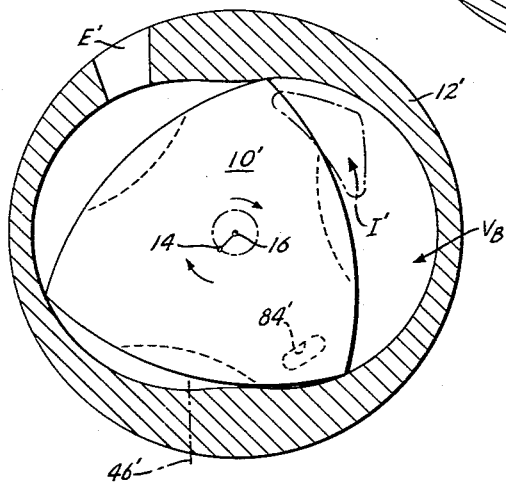
Figure 7A:
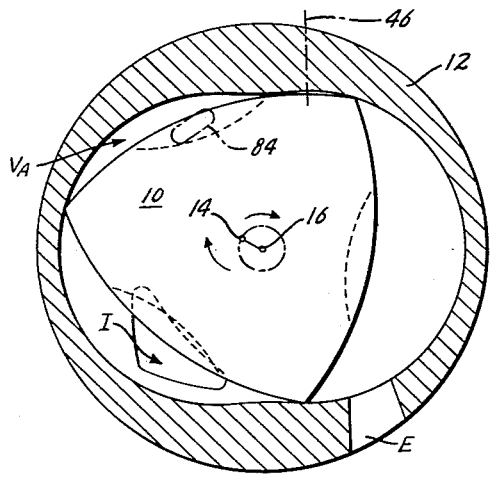
Figure 7C:
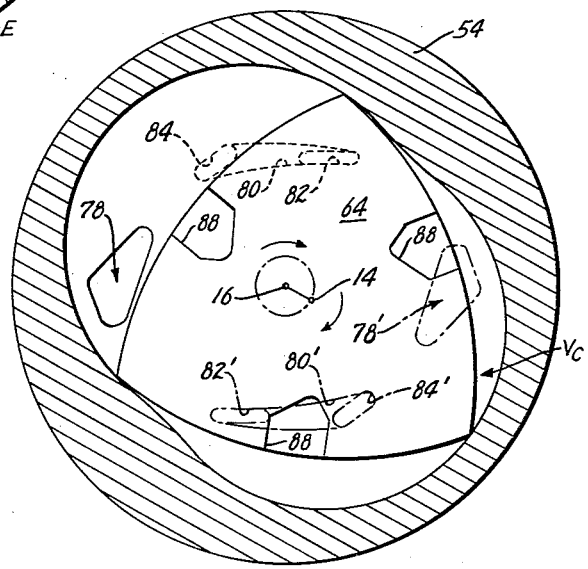
Figure 7B:
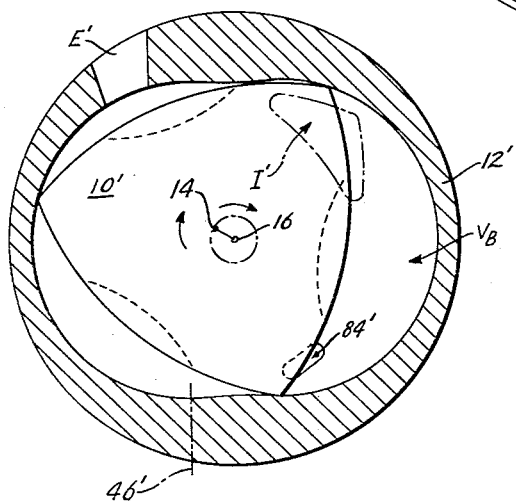
Figure 8A:
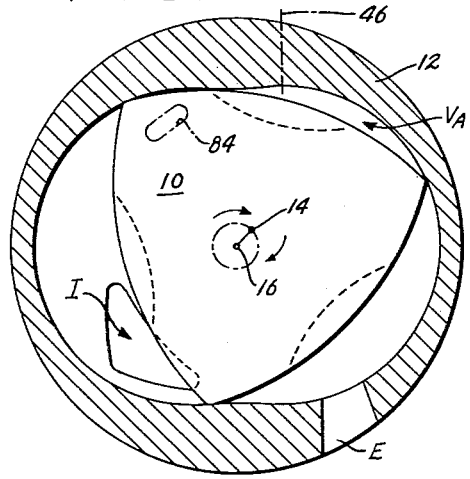
Figure 8C:
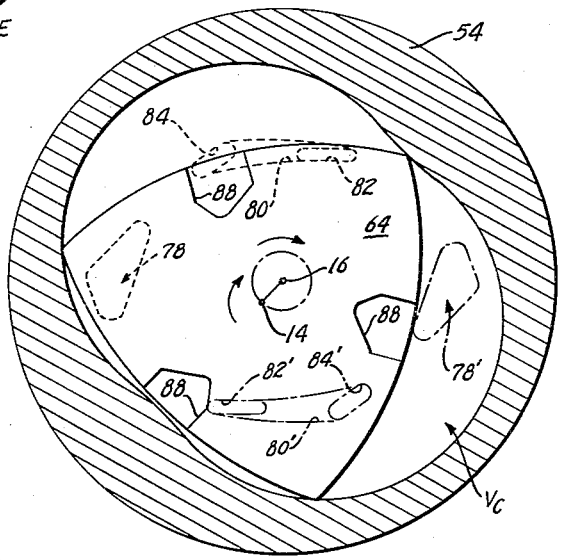
Figure 8B:
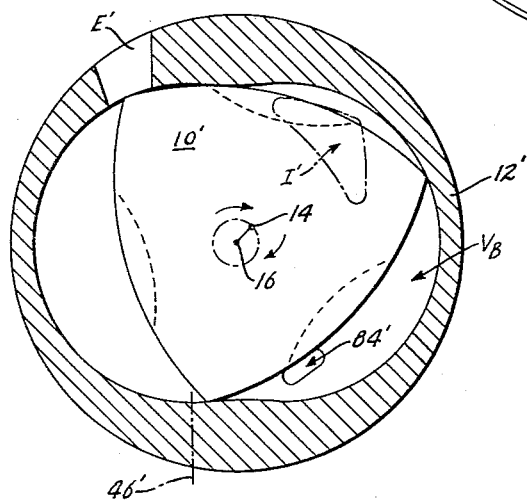

FIGS. 4 through 8 are diagrammatic views of successive phase positions of the two rotating combustion engines A and B and the supercharging means C of FIG. 1; and, more specifically, FIGS. 4A, 4B, and 4C are schematic sectional views of the outer bodies and rotors of the three units which perform the functions of engines A and B and supercharging means C in their operative positions for one phase position of their rotors and outer bodies;

FIGS. 5A, 5B, and 5C are schematic sectional views showing engines A and B and supercharging means C displaced in phase in an intermediate position between the positions shown in FIGS. 4 and 6 respectively; FIG. 5 represents a rotation of the rotors with respect to the outer bodies equivalent to 45° of angular rotation of their common shaft from the position shown in FIG. 4;

FIGS. 6A, 6B, and 6C are schematic sectional views similar to FIGS. 4A, 4B, and 4C showing the relative positions of the rotors and outer bodies of the engines A and B and supercharging means C for a 90° rotation of their common shaft from the FIG. 4 position;

FIGS. 7A, 7B, and 7C are schematic sectional views similar to FIGS. 4A, 4B, and 4C showing the relative positions of the rotors and outer bodies of the engines A and B and supercharging means C for a 180° rotation of the common shaft from the FIG. 4 position; and FIGS. 8A, 8B, and 8C are schematic sectional views similar to FIGS. 4A, 4B, and 4C showing the relative positions of the rotors and outer bodies of the engines A and B and supercharging means C for a 270° rotation of their common shaft from the FIG. 4 position.

It is to be understood that both the foregoing general description and the following detailed description of the invention are exemplary and explanatory but are not restrictive of the invention.

Reference will now be made in detail to the present preferred embodiment of the invention, an example of which is illustrated in the accompanying drawings.

In accordance with the invention, a rotating combustion engine unit and supercharging means for co-operation with the engine unit are provided. As embodied, and as shown in FIGS. 1 through 3, the present preferred embodiment includes a rotating combustion engine unit comprising in tandem arrangement a pair of rotating combustion engines A (FIGS. 1 and 2) and B (FIG. 1) coaxially arranged and disposed on opposite sides of a supercharing means C (FIGS. 1 and 3).

To simplify the drawings, portions of the engines A and B not essential to an understanding of the invention have been omitted and corresponding parts in engines A and B are designated by the same reference numerals, the reference numerals for engine B being primed. Accordingly, it will be understood that the section taken along line 2—2 of FIG. 1 and shown in FIG. 2 would serve equally well for engine B except that the intake and exhaust ports and spark plug for engine B are rotatively spaced by 180° from their corresponding positions in engine A.

Both of the rotating combustion engines are of similar construction, and each comprises a generally triangular rotor 10, 10' having arcuate sides which is eccentrically supported for rotation within an outer body 12, 12'. Although in the present preferred embodiment the outer body 12, 12' is fixed or stationary, the engine is not limited to this preferred embodiment, e.g., either body may be stationary or both bodies may rotate, one relative to the other.

Figure 2:
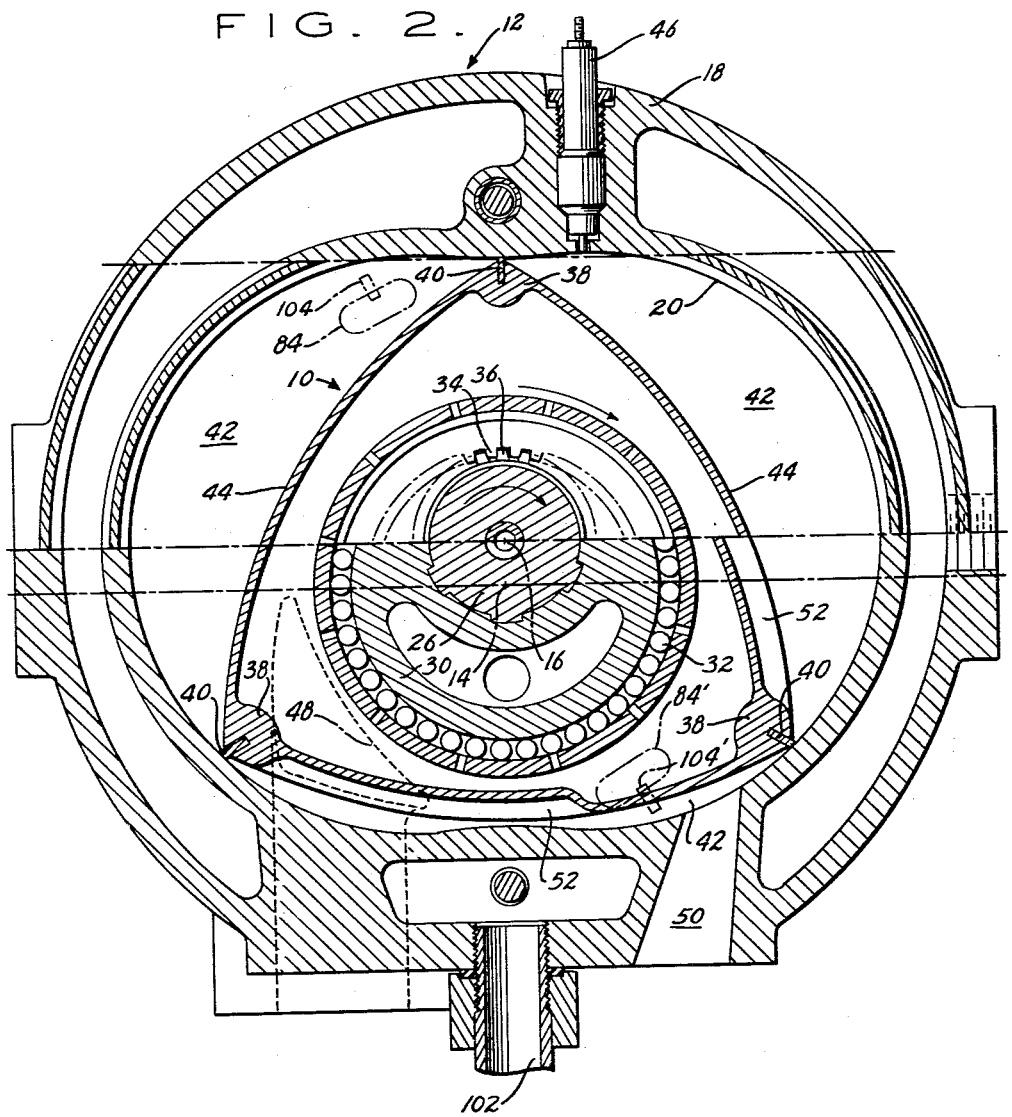
FIG. 2 is a vertical sectional view of one of the engine units, designated engine A, which forms part of the rotating combustion unit of FIG. 1.
Figure 3:
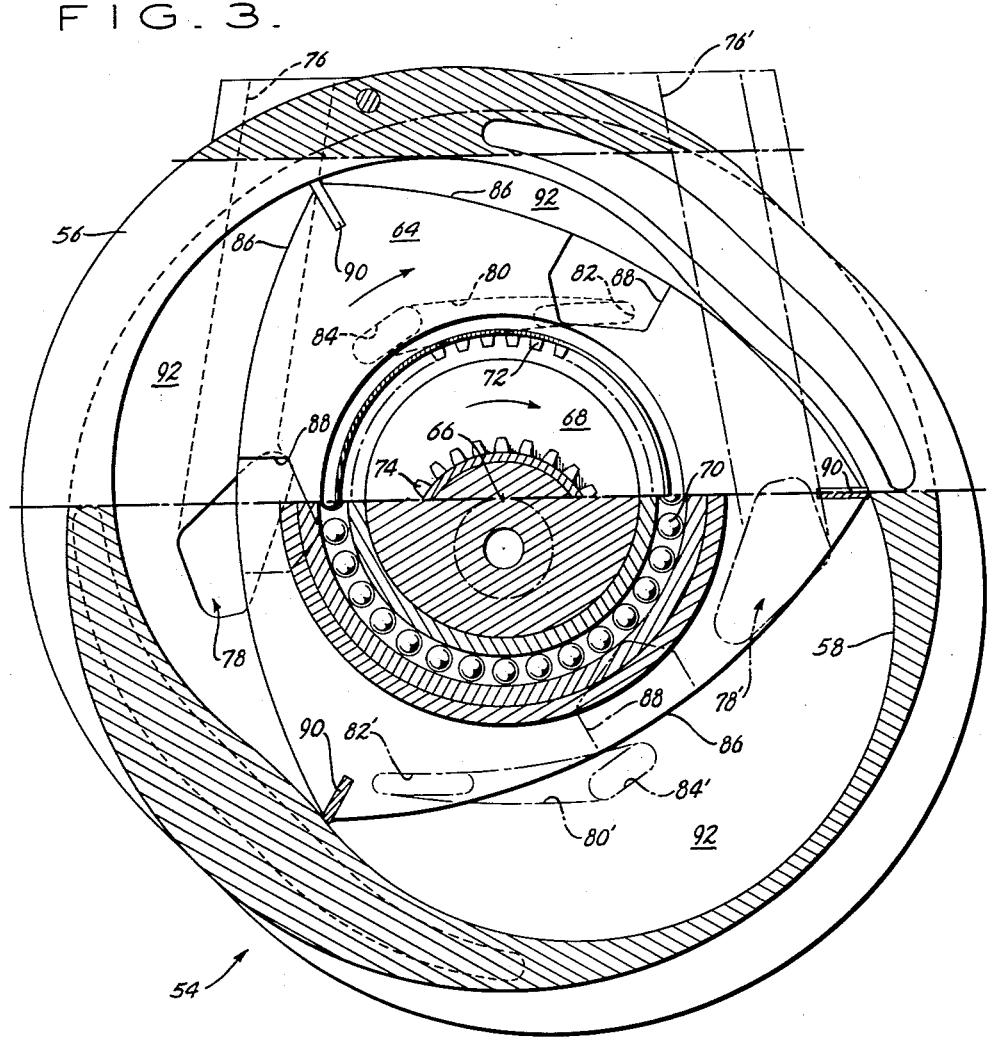
FIG. 3 is a vertical sectional view of the supercharging means C which forms a part of the rotating combustion engine unit of FIG. 1.

As shown in FIGS. 1 and 2 and as here preferably embodied, the outer body 12, 12' comprises a peripheral wall 18, 18' which is substantially an epitrochoid in geometric shape, and includes two arched lobe-defining portions or lobes. The outer body also comprises a pair of axially-spaced end walls 22, 22' and 24, 24' which are disposed on opposite sides of the peripheral wall 18, 18'.

The end walls 22, 22' and 24, 24' support a common shaft 26, the geometric center of which is coincident with the axis 16 of the outer body 12, 12'. This common shaft 26 is supported for rotation by the end walls 22, 22' and 24, 24' on large and ample bearings 28. A pair of eccentrics 30, 30' are rigidly attached to the common shaft 26, and the rotor 10, 10' is supported for rotation or rotatably mounted upon the eccentric 30, 30' by suitable anti-friction bearings 32, 32'. The axis 14 of the engine eccentrics is displaced a distance $e$ from the axis 16, the distance $e$ being equal to the effective eccentricity of the engines.

As shown in FIG. 1, an internally-toothed or ring gear 34, 34' is rigidly attached to one end face of the rotor 10, 10'. The ring gear 34, 34' is in mesh with an externally-toothed or pinion gear 36, 36' which is rigidly attached to the stationary end wall 22, 22' of the outer body 12, 12'.

From this construction, it may be observed that the gearing 34, 34' and 36, 36' does not drive or impart torque to the crankshaft but merely serves to index or register the position of the rotor with respect to the outer body as the rotor rotates relative to the outer body and removes the positioning load which would otherwise be placed upon the apex portions of the rotor 10, 10'.

As shown most clearly in FIG. 2, the rotor 10 includes three apex portions 38 which carry radially movable sealing members 40. The sealing members 40 are in substantially continuous sliding, gas-sealing contact with the inner surface 20 of the outer body 12 as the rotor 10 rotates within the relative to the outer body 12.

By means of the rotation of the rotor 10 relative to the outer body 12, three variable volume working chambers 42 are formed between the peripheral working faces 44 of the rotor 10 and the inner surface 20 of the outer body 12. As embodied in FIG. 2, the rotation of the rotor relative to the outer body is clockwise and is so indicated by an arrow.

A spark plug 46 is mounted in the peripheral wall 18 of the outer body 12, and at the appropriate time in the engine cycle, the spark plug 46 provides ignition for a compressed combustible mixture which on expansion drives the rotor in the direction of the arrow.

Also as shown in FIG. 2, one lobe of the epitrochoidal inner surface 20 is provided with an intake port 48, and the other lobe is provided with an exhaust port 50. As the rotor 10 rotates, a fresh charge is drawn into the working chambers 42 through the intake port 48. This charge is then successively compressed, ignited, expanded, and finally exhausted through the exhaust port 50.

All four successive phases of the engine cycle: intake, compression, expansion, and exhaust, take place within each one of the variable volume working chambers 42 each time the rotor 10 completes one revolution within the outer body, and for each revolution of the rotor, the engine undergoes three cycles.

The working faces 44 of the rotor 10 are provided with cut-out portions or channels 52 which permit combustion gases to pass freely from one lobe of the epitrochoidal inner surface 20 to the other lobe, when the rotor is at or near the top dead center compression position. Also, the compression ratio of the engine may be controlled by adjusting the volume of the channels 52.

Since the gear ratio between the ring gear 34 and the pinion gear 36 is 3:2, each time the rotor 10 completes one revolution about its own axis 14, the shaft 26 rotates three times about its axis 16.

In accordance with the invention, means are provided for supercharging the rotating combustion engines A and B, and as here embodied, the supercharging means comprises a compressor C, which is arranged between engines A and B and disposed between the end walls 24, 24'.

The compressor C, in the illustrated embodiment, is closely similar in construction to the engines A and B. The compressor C (FIGS. 1 and 3) comprises an outer body 54, which in turn comprises a peripheral wall 56 having a two-lobed substantially epitrochoidal inner surface 58.

The compressor outer body 54 also comprises a pair of axially-spaced end walls 60 and 62, which are interconnected by the peripheral wall 56. The end walls 24 and 60 and 24' and 62 form common walls between the compressor C and the engines A and B and are comprised of two parts to facilitate the mounting of the large and ample bearings 28 which support the shaft 26.

As is most clearly shown by FIG. 3, the compressor inner surface 58, like the engine inner surface 20, 20', has substantially the geometric shape of an epitrochoid having two arched lobe-defining portions, or lobes. Within the cavity of the outer body 54 which is formed between its inner surface 58 and the inner surfaces of the end walls 60 and 62, the compressor rotor 64 is mounted for relative rotation with respect to the outer body 54 upon an axis 66 which is eccentric from the axis 16 of the outer body 54.

As here embodied, the compressor rotor 64, like the engine rotor 10, 10', may also approximate in shape the inner envelope of the epitrochoidal inner surface 58 of the compressor C. The compressor eccentric 68 is formed as in integral part of the shaft 26, and the compressor rotor 64 is mounted for rotation upon the compressor eccentric 68 by means of a plurality of anti-friction bearings 70.

Similarly to the engines A and B, the compressor C is also provided with gearing. As here embodied, an internally toothed or compressor ring gear 72 is rigidly secured to the rotor 64, and an externally toothed pinion gear 74 attached to the end wall 62 is in mesh with the rotor ring gear 72. Also, as in the engines A and B, the gear ratio between the compressor ring gear 72 and pinion gear 74 is 3:2.

In the operation of the present invention, the two rotating combustion engines A and B are in phase with respect to the positions of their eccentrics 30, 30', and their rotors 10, 10' are also aligned so that similar sections taken through each engine unit A and B will produce the same projection with respect to rotor position within the outer body 12, 12'.

The working cycles of the engines A and B, however, as will be explained more fully below, are displaced from each other by 180° of shaft rotation. Accordingly, the intake port 48 for engine A (see FIG. 2) and its exhaust port 50 are provided at the lower portion of the peripheral wall 18, as shown in FIG. 1, and the ignition means or spark plug 46 for engine A is located on its upper side.

In engine B, however, the ignition means or spark plug (which is above the plane of the longitudinal section of FIG. 1) is located at the lower portion of its peripheral wall 18', and its intake port (shown in broken line in FIG. 1) and exhaust port are located at the upper portion of peripheral wall 18'. As shown in FIG. 1, the compressor eccentric 68 is angularly displaced by 180° of crankshaft rotation with respect to the engine eccentrics 30, 30' to facilitate balancing of the shaft.

Each of the rotating combustion engines A and B completes one suction or intake phase for each revolution of the shaft 26. Accordingly, the compressor C must operate, in accordance with its function as a supercharging means, to supply both engines A and B with a precompressed charge in the form of air, or over-rich fuel-air mixture, or a stoichiometric mixture for each revolution of the shaft 26. The compressor C, thus, is required to deliver two precompressed charges per revolution of the common shaft 26.

When the supercharging means, or compressor C, is used in combination with the engines A and B, the suction or intake phase of each engine will be in two parts. In the first part of the intake phase pure air or a fuel-air mixture is sucked in through the intake port 48 in the normal manner for such engines. In the second part a precompressed charge is delivered to the engine by the compressor C.

As shown by FIGS. 1 and 3, the compressor C has two intake channels 76 and 76', one of which is arranged in the end wall 60 and opens into the intake port 78, and the other of which is arranged in the end wall 62 and opens into the intake port 78'.

In FIGS. 1 through 8, all hidden portions of ports and channels which are below or behind the plane on which the section is taken are shown in broken line, and all ports and channels which are above or in front of the plane on which the section is taken are shown in phantom or dot-dash outline.

In accordance with the invention, means are provided to transfer the output of the compressor C in the form of a precompressed charge into each engine A and B. As embodied, and as shown most clearly in FIGS. 1 and 3, the means for transferring the output or precompressed charge from compressor C to the engines A and B are transfer passages 80 and 80', shown in broken line and phantom or dot-dash line, respectively.

Transfer passage 80 is arranged within the intermediate wall 24, 60, and transfer passage 80' is arranged within the intermediate wall 24', 62, so that transfer passages 80 and 80' feed the engines A and B, respectively. Also, the transfer passages 80 and 80' extend from outlet ports 82 and 82' provided within the end walls 60 and 62 of the compressor C to inlet or transfer ports 84 and 84' within the end walls 24 and 24', respectively, of engines A and B.

The opening and closing of transfer ports 84 and 84' are controlled by the edges of the working faces 44, 44' of the rotor 10, 10' of the engines A and B as the rotor rotates relative to the outer body 12, 12'. Similarly, the ports 82 and 82' are controlled by the relative rotation of the compressor rotor 68 within the compressor outer body 54.

To achieve the necessary timing, the compressor rotor working faces 86 are provided with deep cut recesses 88. These recesses 88, however, do not extend over the entire width of the working faces 86 but are cut into the end face to as slight an extent as is possible so as not to materially reduce the compressor compression ratio and yet permit them to open the transfer ports 82 and 82'.

Transfer passages 80 and 80' have a relatively small cross-sectional area to provide high transfer velocities.

In addition to the sealing members 40 the rotor 10, 10' of the engines A and B is provided with end face sealing means 41. Similarly, to the rotor 10, 10' the compressor rotor 68 is provided with apex sealing members 90 which serve to seal the variable volume working chambers 92 of the compressor, one from the other, during relative rotation of the compressor rotor 68 within its outer body 54.

Unlike the rotor 10, 10' of the engines A and B, however, the rotor 68 of the compressor C need not have end face sealing means, comparable to the end face sealing means 41 of the rotor 10, 10'. As contrasted with the engines A and B, burning gases are not present in the compressor C and thermal distortions between the end faces of the rotor 68 and the end walls 60 and 62 of the compressor outer body 54 do not offer a problem.

To keep the transfer passages 80 and 80' as short as possible, the outer body 54 and rotor 68 of the compressor C are angularly displaced with respect to the outer body 12, 12' and rotor 10, 10' of the engines A and B. In the present preferred embodiment, this displacement is approximately 45° and is shown in the drawings by the comparative displacement of the compressor C in FIG. 3 to the engine A in FIG. 2.

Additional features, as shown in FIG. 1, which complete the general construction of the tandem arranged engines A and B and compressor C are the following: appropriately arranged passages for the circulation of cooling and lubricating fluid to the various bearings and to the rotor 10, 10'; suitable counter weights 94 to dynamically balance the entire mechanism; a central bore 96 in the crankshaft 26 which receives cooling and lubricating fluid through a hollow spindle 98 which is aligned with the central bore by conventional bearings; a power take-off coupling unit 100 at the opposite end of the shaft 26 from the spindle 98; appropriate passages in the outer body 12, 12' for the circulation of the cooling fluid and intake passages 102, 102' for the introduction of this cooling liquid; and, in the illustrative embodiment shown, the rotor 68 of the compressor C is constructed in two parts for ease of assembly of the mechanism.

In operation of one form of the complete mechanism, the rotating combustion engines A and B draw or suck in pure air through their intake ports 48, 48', and the compressor C compresses an over-rich fuel-air mixture and blows this mixture into the working chambers of the rotating combustion engines not earlier than approximately at the completion of the normal intake phase, thereby permitting the engines A and B to efficiently and effectively make use of the less-volatile fuels.

It is also possible for both the engine and the compressor to utilize a fuel-air mixture. When operating in this manner, the engine itself will first suck in or draw in a fuel-air mixture, and then during the compression phase the compressor will deliver to the engine a second precompressed fuel-air mixture.

In a still further method of operation, both the rotating combustion engines and the compressor suck in or draw in pure air and supplementary means is used to admix fuel with the precompressed air as it travels through the transfer passages 80, 80' from the compressor C to the engines A and B. As embodied, the means for admixing the fuel may be a pressure carburetor or an injection nozzle 104, 104' as shown by phantom lines in FIGS. 1 and 2.

When supplementary fuel admixing means, such as an injection nozzle 104, 104' is used, the high transfer velocity of the precompressed air through the transfer passages 80, 80' from the compressor C to the engines A and B insures a thorough dispersion of the fuel within the precompressed charge to provide an efficiently combustible fuel-air mixture.

To more clearly illustrate and explain the operation of the mechanism, reference will now be made in detail to FIGS. 4 through 8 of the drawings which diagrammatically illustrate the phase relationships between the rotating combustion engines A and B and the compressor C at various points in the completion of one-third of an engine cycle.

In each of FIGS. 4 through 8, the upper outer body and rotor represent engine A, the lower outer body and rotor represent engine B and the intermediate outer body and rotor represent the compressor C, as shown in FIGS. 1 through 3. Accordingly, FIG. 4A represents the engine A, FIG. 4B represents the engine B, and FIG. 4C represents the compressor C, and this same scheme of representation extends throughout all of the FIGS. 4 through 8.

A phase difference of 90° of angular rotation of the shaft 26 is illustrated in each of the FIGS. 4, 6, 7, and 8. FIG. 5, however, illustrates an intermediate position of angular rotation of the shaft 26 and represents a phase difference of only 45° from FIG. 4, or an intermediate position of shaft rotation between that shown for FIG. 4 and that shown for FIG. 6.

As previously described, for each revolution of the rotor 10, 10' relative to the outer body 12, 12', the shaft 26 rotates three times in the same direction. Similarly, the compressor rotor 68 completes one revolution with respect to the compressor outer body 54 for each three revolutions of the shaft 26 which acts as the driving member for the compressor.

Accordingly, although the progression of schematic sectional views through FIGS. 4–8 and back to FIG. 4 again represents only one-third of a revolution of the rotor 10, 10' and one-third of a revolution of the compressor rotor 64, this procession of figures, nevertheless, represents one full revolution of the crankshaft 26, or 360° of shaft rotation.

The diagrammatic views of FIGS. 4–8 depart somewhat from the construction shown in FIGS. 1–3 in order to simplify the explanation of the operation of the engine. The views shown in 4A, 5A, 6A, 7A, 8A are schematic transverse sections taken along the line 2—2 of FIG. 1, and the views shown in 4C, 5C, 6C, 7C are schematic transverse sections taken along the line 3—3 of FIG. 1, while FIGS. 4B, 5B, 6B, 7B, and 8B represent schematic transverse sections taken through engine B of FIG. 1, the sections all being viewed toward the left in FIG. 1.

FIGS. 4–8 show the relationships of the rotors and outer bodies of engines A and B and compressor C through a shaft rotation of 270° from the initial position shown in FIG. 4; the return from FIG. 8 back to FIG. 4 completes the illustration of a full one-third engine cycle through a shaft rotation of 360° with the engine ready to commence the next one-third cycle, or full revolution of the shaft 26.

Where appropriate, the same reference numerals are used in FIGS. 4–8 which are used in FIGS. 1–3. The portions shown in broken line in FIGS. 4–8 are to be considered to be behind or below the plane on which the section is taken, and the portions shown in phantom or dot-dash line are considered to be in front of or above the plane of the section.

For simplification, the intake ports for engines A and B will be designated I and I', respectively, and the exhaust ports for engines A and B will be designated E and E', respectively.

Also, to simplify and clarify the explanation of the mechanism, the various operative steps which take place as the shaft 26 rotates through an angular distance of 360°, as shown in FIGS. 4–8, will be explained with respect to a single chamber $V_A$ for engine A and a single chamber $V_B$ for engine B. During this same period, the rotors 10 and 10' rotate through an angular distance of 120° to move the succeeding upstream chambers into the positions occupied by chambers $V_A$ and $V_B$ in FIGS. 4A and 4B.

Reference will now be made to FIG. 4, which, in FIG. 4A, shows engine A with its chamber $V_A$ in a phase just prior to completion of its normal intake or suction phase. The intake port I is partially closed by the rotor 10 and the transfer port 84 of transfer passage 80 is partially opened by the rotor 10. At this same time, in the compressor chamber $V_C$ the port 82 of the transfer passage 80 is about to be opened by the recess 88 in the compressor rotor 64 to permit the charge which has been precompressed in chamber $V_C$ to be blown into chamber $V_A$ through outlet port 82, transfer passage 80, and transfer port 84. The position shown in FIG. 4, is, accordingly, just prior the beginning of the transfer operation for engine A.

At the same point in operation, the intake port I' of engine B is partially open, and the chamber $V_B$ is undergoing the intake phase. The ports 84' and 82' of the transfer passage 80' are covered by the rotors 10' and 64 of engine B and compressor C, respectively, and the transfer passage 80' is thereby effectively sealed at both its ends.

FIG. 5 depicts schematically the relative position of the rotors and outer bodies after the shaft 26 has rotated through an angle of 45° from the position shown in FIG. 4. In the position shown in FIG. 5B, the working chamber downstream from chamber $V_B$ has moved into a position in which it is at top dead center compression, and in this position it undergoes ignition by suitable means, such as spark plug 46'.

During this phase of operation, transfer port 84' of engine B is still closed by rotor 10', but the rotor 10' has moved into a position which completely opens the intake port I' continuing the suction or intake phase for working chamber $V_B$.

At the same time transfer port 84 of engine A has been completely uncovered by the rotor 10 in working chamber $V_A$, and the outlet port 82 at the compressor end of transfer passage 80 has been uncovered by the recess 88 of rotor 64 in the compressor C, as shown in FIG. 5C. The relative positions of engine A and compressor C now permit the transfer operation to take place from compressor C to engine A, and a precompressed charge is delivered from compressor C through the transfer passage 80 into engine A.

FIG. 6 discloses schematically the relative positions of the rotors and outer bodies when the shaft 26 has undergone another 45° in angular rotation from the position shown in FIG. 5, or 90° of rotation from the position shown in FIG. 4. As shown in FIG. 6A, the transfer operation for chamber $V_A$ has been completed, and this may be confirmed by reference to FIG. 6C which shows that the rotor 64 has now covered or sealed the port 82 of the transfer passage 80. At the same time, in engine B the intake phase of chamber $V_B$ continues and the ports 84' and 82' of transfer passage 80' remain closed.

FIG. 7 discloses diagrammatically the relative positions of the rotors and the outer bodies after an angular rotation of the shaft 26 of 180° from the FIG. 4 position. In engine A, chamber $V_A$ is nearing maximum compression, while in engine B, chamber $V_B$ is in the same relative position that chamber $V_A$ occupies in FIG. 4A and is about to complete its normal intake phase through intake port I'. Although the port 84' of transfer passage 80' is commencing to open in chamber $V_B$, reference to FIG. 7C will show that port 82' in compressor C is still closed by its rotor 64.

In FIG. 8 the relative positions of the rotors and outer bodies are shown after 270° of angular rotation of shaft 26 from the position of FIG. 4. Chamber $V_A$ of engine A has now moved 45° of shaft rotation past the top dead center compression position and ignition has taken place.

For engine B, the ransfer operation from the compressor C to chamber $V_B$ has been completed; transfer port 84' has been closed by rotor 64 of the compressor C, but it may be seen by comparison of FIG. 7C with FIG. 8C that the recess 88 uncovered the port 84' while passing from its position in FIG. 7C to its position in FIG. 8C.

If a return to FIG. 4 is now made, the rotors and outer bodies may be viewed in their relative position after completing a full 360° of shaft rotation.

To recapitulate, for each complete cycle within one working chamber of the engines A and B, the crankshaft 26 completes three revolutions. The working chambers of the respective engines A and B are displaced out of phase by 180° but their eccentrics are in phase, while the compressor eccentric is displaced 180° from the engine eccentrics, thereby facilitating proper dynamic balance of the mechanism as a whole.

In the foregoing detailed description of the present preferred embodiment, it is apparent that this embodiment is restricted to mechanisms in which the outer bodies are stationary and the rotors and eccentrics are rotary, but it is not intended to limit the scope of the invention to such a mechanism. It is obvious with mechanical changes which would be obvious to a person skilled in the art, alternative embodiments of the invention could be constructed in which both the outer bodies and rotors are rotary and the eccentrics are stationary with the power shaft being taken off the outer body.

Accordingly, the invention in its broader aspects is not limited to the specific mechanisms shown and described, but also includes within the scope of the accompanying claims any departures made from such mechanisms which do not sacrifice its chief advantages.

What is claimed is:

1. An internal combustion engine unit comprising first and second rotating combustion engines and a rotary compressor; each of said engines having a cycle which includes the phases of intake, compression, expansion, and exhaust; the engines having a common power take-off part and each of said engines performing one intake phase during each revolution of its power take-off part; the intake phase of said first engine being displaced from the intake phase of said second engine; said rotary compressor being driven by the common power take-off part of the engines, said rotary compressor having an intake phase and a compression phase, and performing two compression phases during each revolution of the power take-off part to deliver a precompressed fluid medium alternately to said first and second engines.

2. The invention as defined in claim 1, in which the intake phase of said first engine is displaced by 180° of angular rotation of its power take-off part from the intake phase of said second engine.

3. The invention as defined in claim 1, in which the rotary compressor is positioned between said first and second engines in tandem relationship.

4. The invention as defined in claim 1, including a first passage means between said rotary compressor and said first engine, and a second passage means between said rotary compressor and said second engine for transferring a precompressed fluid medium from said compressor to said first and second engines, respectively.

5. The invention as defined in claim 1, including a first end wall disposed between said first engine and said compressor, and a second end wall disposed between said compressor and said second engine.

6. The invention as defined in claim 1, in which said first and second engines and said compressor each comprise an outer body and an inner body, the outer and the inner bodies of said first and second engines being in phase, and the outer and inner body of the compressor being angularly displaced in phase relationship with respect to the outer and inner bodies of said first and second engines.

7. The invention as defined in claim 1, in which the power take-off part comprises a common shaft having first, second, and third eccentric portions; and the first and second engines and rotary compressor each comprises a hollow outer body having an axis and a rotor rotatably mounted within the outer body on an axis eccentric to the axis of the outer body and rotatable relative to the outer body; said first and second engine rotors and said compressor rotor being rotatably mounted upon said first, second, and third eccentric portions, respectively; said common shaft having an axis coincident with the axis of the outer body and said eccentric portions having axes coincident with the axes of their rotors; said first and second eccentric portions being in phase with each other and displaced 180° about the shaft axis from said third eccentric portion.

8. The invention as defined in claim 1, in which said first and second engines and said rotary compressor each comprises a hollow outer body having an axis, axially-spaced end walls and a peripheral wall interconnecting the end walls, a rotor mounted within the outer body on an axis eccentric to the axis of the outer body and rotatable relative to the outer body, the rotor having end faces disposed adjacent to the end walls and a plurality of circumferentially-spaced apex portions for sliding and sealing engagement with the inner surface of the peripheral wall to form a plurality of working chambers between the rotor and peripheral wall which vary in volume upon relative rotation of the rotor within the outer body, and at least one intake port and one exhaust port in operative communication with said variable volume working chambers.

9. The invention as defined in claim 8, in which the inner surface of the peripheral wall has two lobes and the rotor has three apex portions.

10. The invention as defined in claim 8, in which the engine and compresser outer bodies include a cavity formed between the end walls and the peripheral wall of each outer body, said first and second engines having their cavities aligned with each other and having their intake and exhaust ports displaced from each other by 180° about the axis of the outer body.

11. The invention as defined in claim 10, in which the cavity of the compressor is angularly displaced about the shaft axis from the engine cavities.

12. The invention as defined in claim 8, in which the rotary compressor is positioned between said first and second engines; and including a first end wall disposed between said first engine and said compressor, a second end wall disposed between said compressor and said second engine, a first passage means in said first wall, and a second passage means in said second wall for transferring a precompressed fluid medium from said compressor to said first and second engines, respectively.

13. The invention as defined in claim 8, in which the rotary compressor is positioned between said first and second engines; and including a first common end wall disposed between said first engine and said compressor, a second common end wall disposed between said compressor and said second engine, a first transfer passage in said first wall and a second transfer passage in said second wall for delivery of a precompressed charge from said compressor to said first and second engines, respectively; a first port for said first transfer passage, and a second port for said second transfer passage, said first port being controlled by one side of the rotor of said compressor and said second port being controlled by the other side of said compressor rotor.

14. The invention as defined in claim 13, in which each port is opened by the rotor of said compressor substantially at the end of the intake phase of the engine associated with said port.

15. The invention as defined in claim 13, in which each of said ports is arranged to be opened by the rotor of said compressor when a pressure ratio at least equal to the critical pressure ratio exists between the compression chamber of said compressor in communication with said port and the engine working chamber in communication with the transfer passage which cooperates with said port.

16. The invention as defined in claim 13, in which the rotor of said compressor has recess means to uncover said first and second ports to provide communication with said transfer passages and to time the delivery of a precompressed charge to the engines.

17. The invention as defined in claim 13, in which said first and second ports are diametrically opposed to each other about the axis of the shaft.

18. An internal combustion engine unit comprising first and second rotating combustion engines each having a cycle which includes the four phases of intake, compression, expansion, and exhaust; a compressor cooperating with said first and second engines to deliver a precompressed charge to each engine each time it undergoes an intake phase; and a common shaft; said first and second engines and said compressor being arranged in tandem relationship with said shaft, said compressor being positioned between said engines, each engine undergoing an intake phase during each revolution of the common shaft, the intake phases of said first and second engines being displaced by 180° of shaft rotation from each other, and said compressor performing two delivery phases for each revolution of the shaft to feed each engine once during each revolution.

No references cited.